(12) United States Patent
Kuo

(10) Patent No.: US 6,239,424 B1
(45) Date of Patent: May 29, 2001

(54) LIGHT DETECTING SYSTEM FOR DETECTING LIGHT PROJECTED FROM A PROJECTOR

(75) Inventor: Liang-Hsu Kuo, Taipei Hsien (TW)

(73) Assignee: Primax Electronics Ltd., Taipei Hsien (TW)

( * ) Notice: Subject to any disclaimer, the term of this patent is extended or adjusted under 35 U.S.C. 154(b) by 0 days.

(21) Appl. No.: 09/378,703

(22) Filed: Aug. 23, 1999

(30) Foreign Application Priority Data

Jul. 16, 1999 (TW) .................................................. 88112060

(51) Int. Cl.⁷ ...................................................... G02B 27/10
(52) U.S. Cl. ............................ 250/221; 353/79; 359/649
(58) Field of Search ................................ 250/221, 222.1, 250/208.1, 559.21; 353/28, 40, 79; 356/391; 359/369, 479, 649, 798, 801

(56) References Cited

U.S. PATENT DOCUMENTS 4,343,539 * 8/1982 Task ........................................ 535/69
5,850,085 * 12/1998 Rosenbluth ....................... 250/559.21
5,907,437 * 5/1999 Sprotbery et al. .................... 359/649

* cited by examiner

Primary Examiner—Stephone B. Allen
(74) Attorney, Agent, or Firm—Winston Hsu

(57) ABSTRACT

The invention relates to a light detecting system for detecting light projected from a projector. When the projector is initiated, it will project a picture image forward. The light detecting system comprises a frame positioned at a predetermined position in front of the projector, a detecting device movably installed on the frame for detecting the picture image, a driving device installed on the frame for moving the detecting device, and a control device connected with the driving device and the detecting device for controlling the driving device to move the detecting device to various sampling positions on the frame and to control the detecting device to detect the picture image at each of the sampling positions.

10 Claims, 4 Drawing Sheets

LIGHT DETECTING SYSTEM FOR DETECTING LIGHT PROJECTED FROM A PROJECTOR

BACKGROUND OF THE INVENTION

1. Field of the Invention

The invention relates to a light detecting system, and more particularly, to a light detecting system for detecting light projected from a projector.

2. Description of the Prior Art

Please refer to FIG. 1 and FIG. 2 FIG. 1 is a perspective view of a prior art light detecting system 50 and a projector 52. FIG. 2 is a front view of the light detecting system 50 in FIG. 1. The light detecting system 50 is used for detecting light projected from the projector 52. When the projector 52 is initiated, it will project a picture image forward. The light detecting system 50 comprises a frame 54 positioned at a predetermined position in front of the projector 52, thirteen light sensors 56 fixed on the frame 54 for detecting the picture image, a control device 60 connected with the projector 52, and a screen 58 installed on the frame 54 to form a surface with a position mark. The control device 60 is used to output an image signal to the projector 52 so that the projector 52 can project a picture image onto the screen 58. The position mark on the screen 58 is used to calibrate the position of the picture image on the screen 58.

The screen 58 has five equally spaced vertical lines 53A, 53B, 53C, 53D, 53E and five equally spaced horizontal lines 55A, 55B, 55C, 55D, 55E. The vertical and horizontal lines form a number of intersections on the screen 58. Thirteen of these intersections are defined as sampling positions. The thirteen light sensors 56 are installed at corresponding sampling positions for detecting light emitted from the projector 52 so as to calculate various parameters of the picture image such as average luminous flux, light uniformity, color temperature, color coordinate, color balance, color uniformity and color contrast ratio.

Because the light sensors 56 are very expensive and the light detecting system 50 uses thirteen of them, the cost of the light detecting system 50 becomes extremely high. Moreover, the light sensors 56 are fixed on the screen 58, therefore the number of sampling positions cannot be increased when more detailed analysis of the picture image is required.

SUMMARY OF THE INVENTION

It is therefore a primary objective of the present invention to provide a light detecting system to solve the above mentioned problems.

Briefly, in a preferred embodiment, the present invention provides a light detecting system for detecting light projected from a projector. When the projector is initiated, it will project a picture image forward. The light detecting system comprises:

- a frame positioned at a predetermined position in front of the projector;
- a detecting device movably installed on the frame for detecting the picture image;
- a driving device installed on the frame for moving the detecting device; and
- a control device connected with the driving device and the detecting device for controlling the driving device to move the detecting device to various sampling positions on the frame and to control the detecting device to detect the picture image at each of the sampling positions.

It is an advantage of the present invention that the light detecting system utilizes the moveable light detecting device to detect the picture image so that the cost of the light detecting system is greatly reduced and more samples of the picture image can be taken when required.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
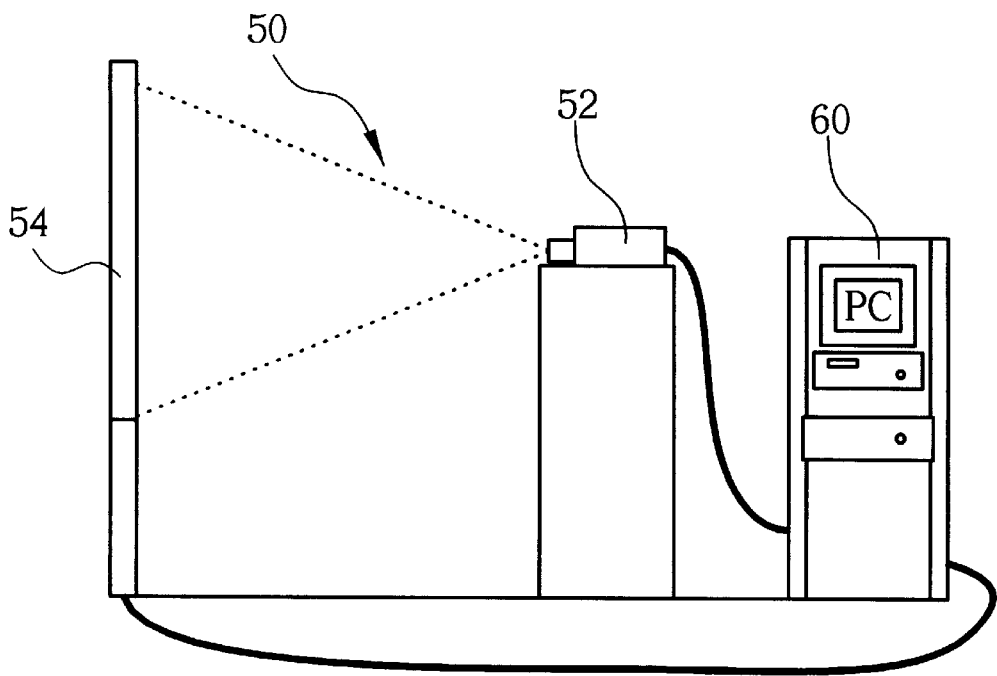
FIG. 1 is a perspective view of a prior art light detecting system and a projector.
Figure 2:
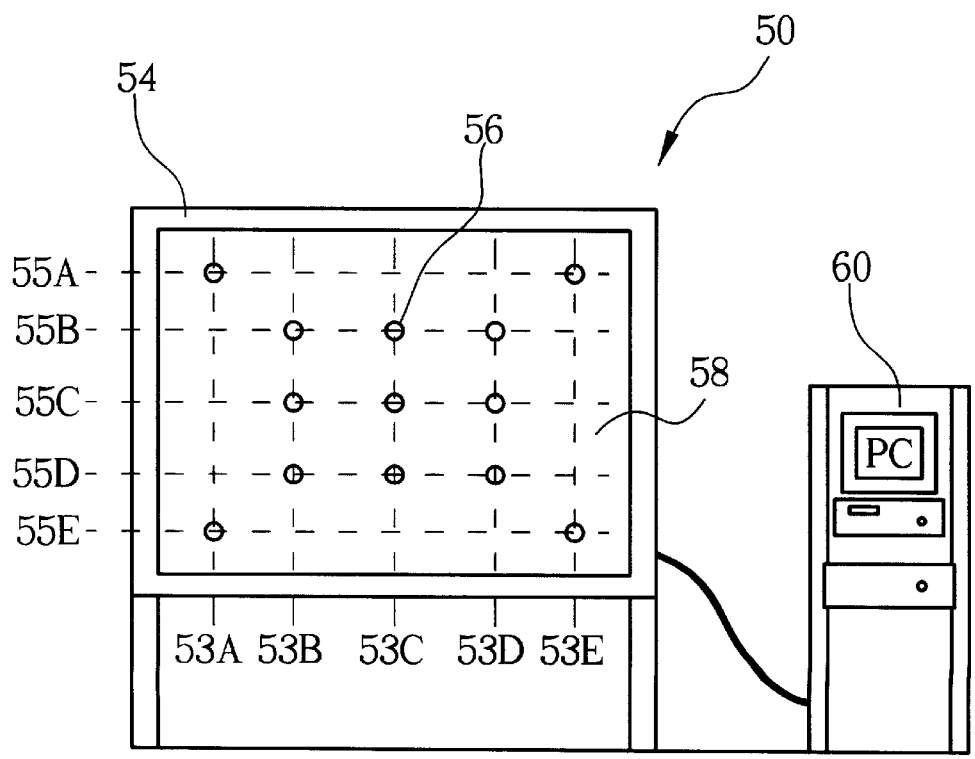
FIG. 2 a front view of the light detecting system in FIG. 1.
Figure 3:
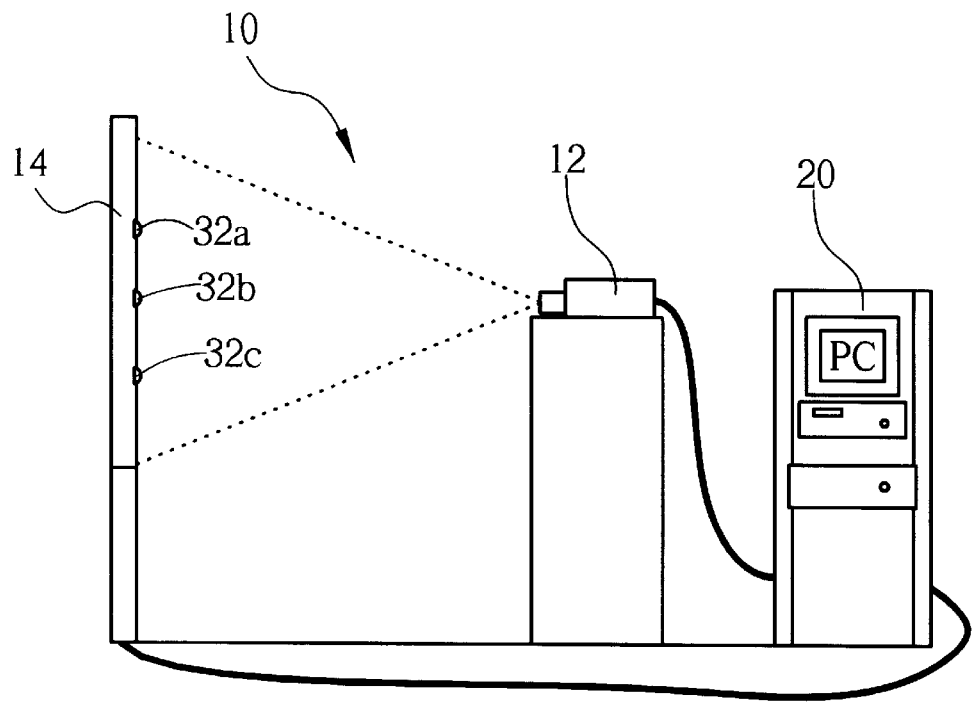
FIG. 3 is a perspective view of a light detecting system and a projector according to the present invention.
Figure 4:
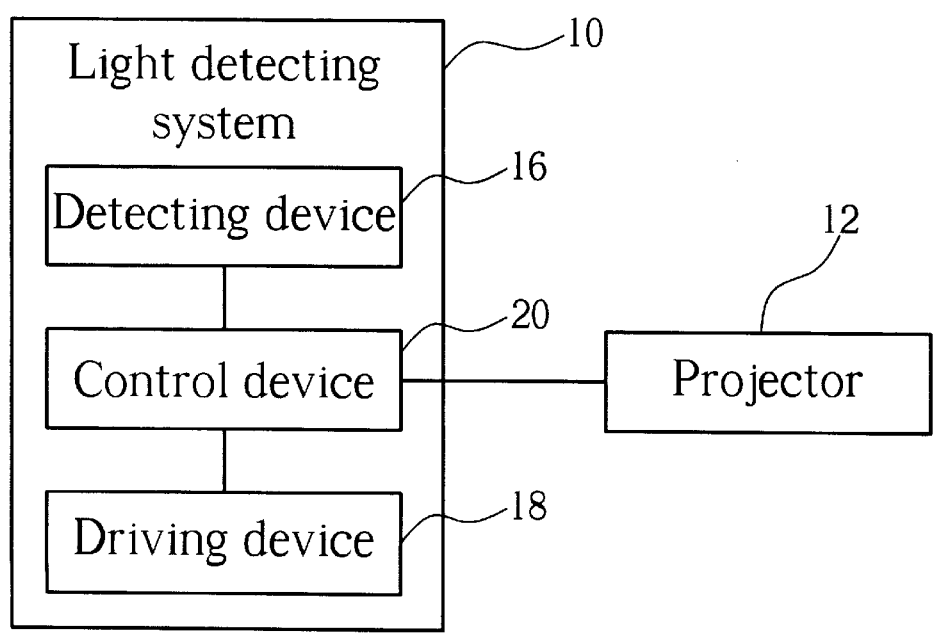
FIG. 4 is a functional block diagram of the light detecting system and the projector in FIG. 3.
Figure 5:
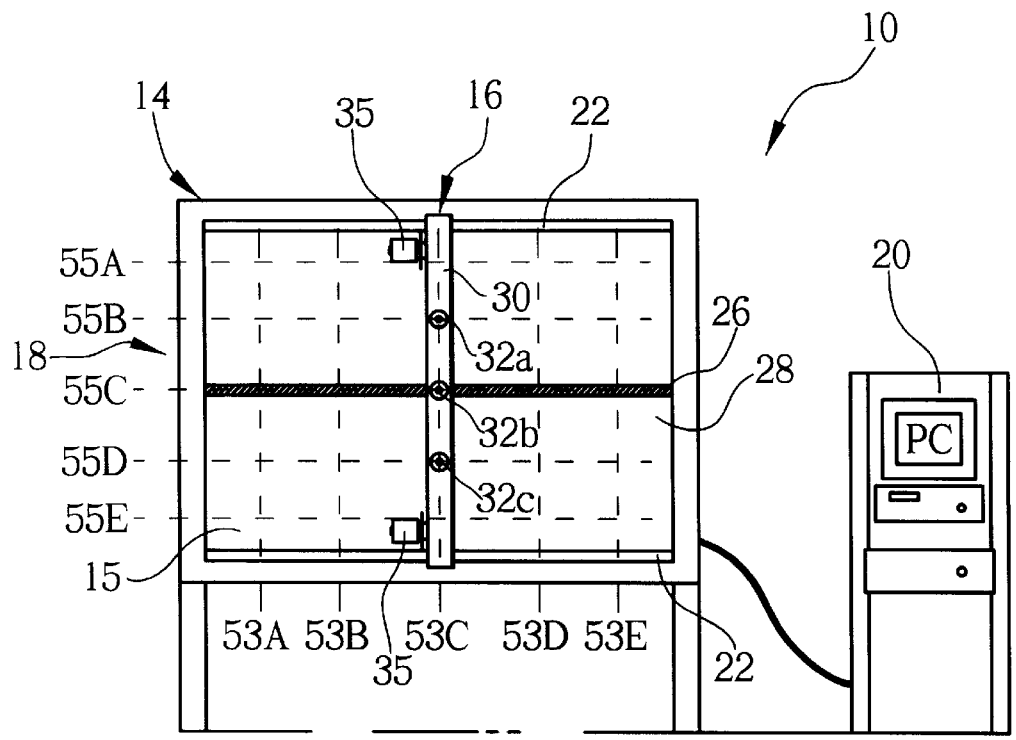
FIG. 5 is a front view of the light detecting system in FIG. 3.
Figure 6:
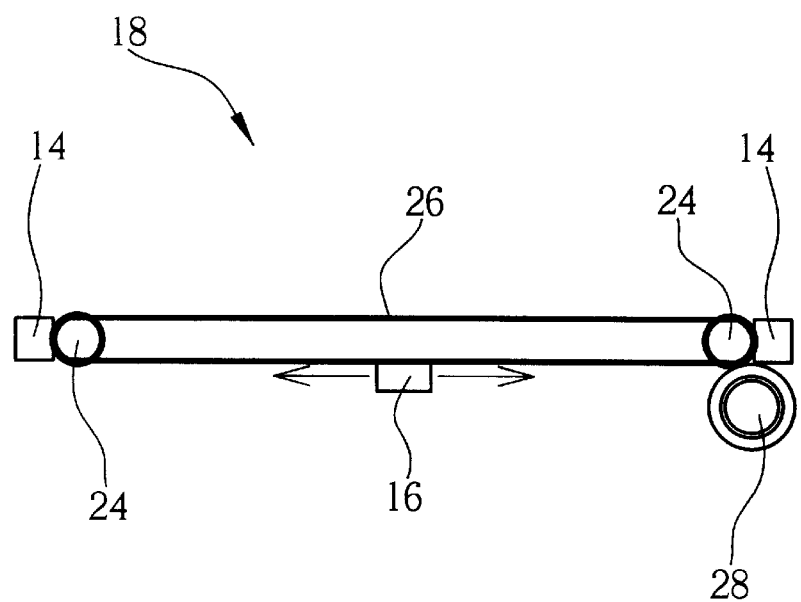
FIG. 6 is a side view of the driving device in FIG. 5.

Please refer to FIG. 3 to FIG. 6. FIG. 3 is a perspective view of a light detecting system 10 and a projector 12 according to the present invention. FIG. 4 is a functional block diagram of the light detecting system 10 and the projector 12. FIG. 5 is a front view of the light detecting system 10 in FIG. 3. FIG. 6 is a side view of the driving device 18 in FIG. 5. The light detecting system 10 is used for detecting light projected from the projector 12. When the projector 12 is initiated, it will project a picture image forward. The light detecting system 10 comprises a frame 14 positioned at a predetermined position in front of the projector 12, a detecting device 16 movably installed on the frame 14 for detecting the picture image, a driving device 18 installed on the frame 14 for moving the detecting device 16, a control device 20 connected with the driving device 18, the detecting device 16 and the projector 12, and a screen 15 installed on the frame 14 to form a surface with at least one position mark. The position mark on the screen 15 is used for calibrating the position of the picture image projected on the screen 15.

The control device 20 is electrically connected with the projector 12 for outputting an image signal to the projector 12 so that the projector 12 can project a picture image onto the screen 15. The control device 20 is also used for controlling the driving device 18 to move the detecting device 16 to various sampling positions on the screen 15 so that the detecting device 16 can detect light at each of the sampling positions so as to calculate various parameters of the picture image such as average luminous flux, light uniformity, color temperature, color coordinate, color balance, color uniformity and color contrast ratio.

As shown in FIG. 5 and FIG. 6, one rail 22 is horizontally installed at each of the upper and lower ends of the frame 14, and the upper and lower ends of the detecting device 16 are slidably installed on the two rails separately and can be moved toward the left or right end of the frame 14. The driving device 18 comprises two wheels 24 rotatably fixed at the left and right ends of the frame 14, a circular bell 26 encircled around the two wheels 24 for moving the detecting device 16, and a step motor 28 installed on the frame 14 for driving the circular bell 26 according to a control signal transmitted from the control device to move the detecting device 16 to each of the sampling positions on the screen 15.

As shown in FIG. 5, the detecting device 16 comprises a column-shaped chassis 30 and three light sensors 32a, 32b, 32c installed on the chassis 30 for sensing light. The light sensor 32b is fixed on the middle of the chassis 30, and the detecting device 16 further comprises two step motors 35 fixed on the chassis 30. The two step motors 35 separately move the two movable light sensors 32a and 32c to various sampling positions to detect the picture image at each of the sampling positions according to the control signal transmitted from the control device 20.

Figure 7:
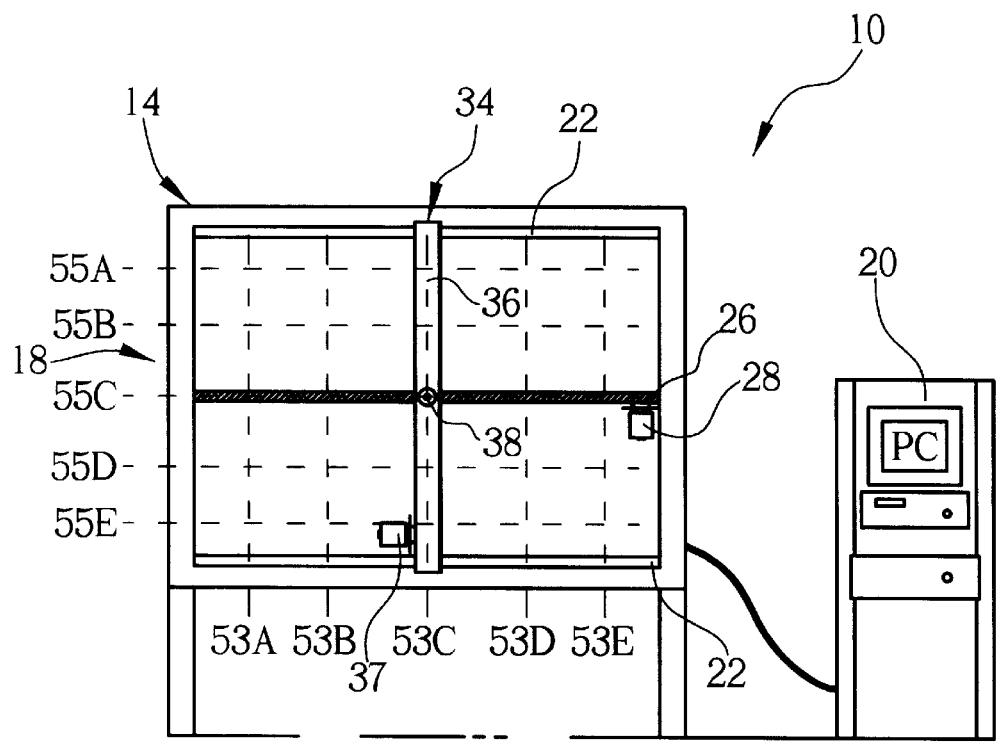
FIG. 7 shows a light detecting system with one moveable light sensor according to the present invention.

Please refer to FIG. 7. FIG. 7 shows another detecting device 34 of the light detecting system 10 according to the present invention. The detecting device 34 comprises a column-shaped chassis 36, a light sensor 38 movably installed on the chassis 36 for sensing light, and a step motor 37 fixed on the chassis 36 for moving the light sensor 38 to various sampling positions according to the control signal transmitted from the control device 20 so as to detect the picture image at each of the sampling positions.

Figure 8:
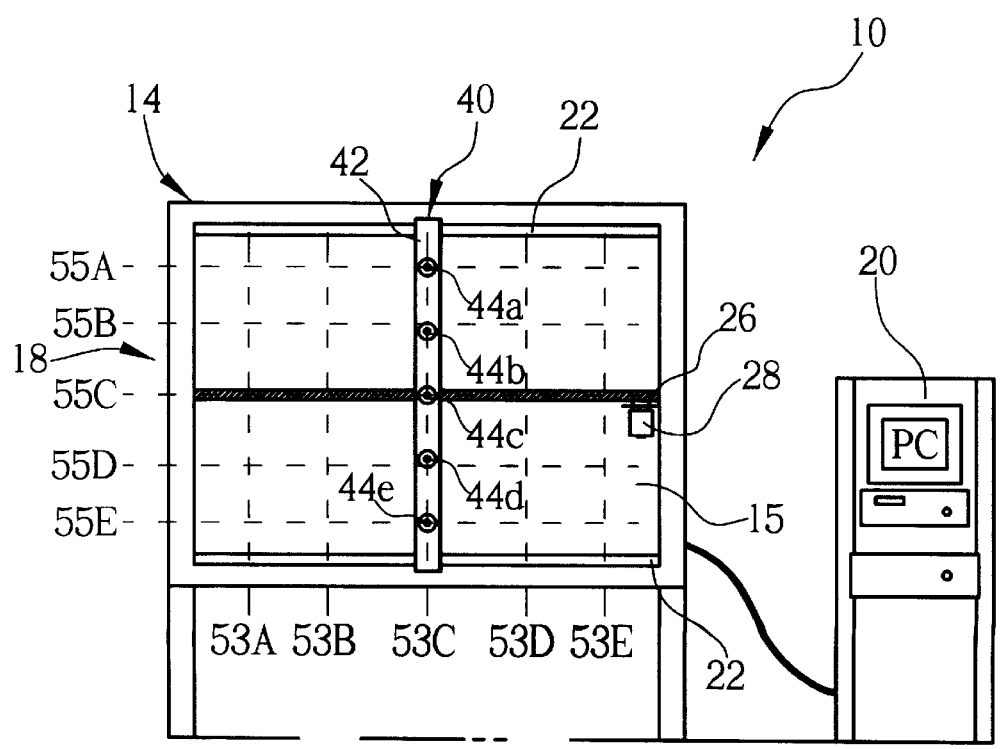
FIG. 8 shows a light detecting system with five fixed light sensors according to the present invention.

Please refer to FIG. 8. FIG. 8 shows another detecting device 40 of the light detecting system 10 according to the present invention. The detecting device 40 comprises a column-shaped chassis 42 and five fixed light sensors 44a, 44b, 44c, 44d, 44e installed on the chassis 42 for sensing light. When the step motor 28 of the driving device 18 drives the circular bell 26 according to the control signal transmitted from the control device 20, the detecting device 40 is moved to each of the sampling positions on the frame 14.

When the chassis 42 of the detecting device 40 is moved to vertical lines 53A or 53E of the screen 15, the control device 20 will turn on the light sensors 44a, 44e, and turn off the light sensors 44b, 44c, 44d. When the chassis 42 of the detecting device 40 is moved to the vertical lines 53B, 53C or 53D of the screen 15, the control device 20 will turn on the light sensors 44b, 44c, 44d, and turn off the light sensors 44a, 44e. Because the detecting device 40 of the light detecting system 10 uses only five light sensors, the cost of the light detecting system 10 is greatly reduced.

Compared with the prior art light detecting system 50, the light detecting system 10 uses fewer light sensors to perform detection of the picture image. Therefore, the cost of the light detecting system 10 is greatly reduced. Moreover, since the light sensors are moveable, more samples of the picture image can be taken when required.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A light detecting system for detecting light projected from a projector wherein when the projector is initiated, it will project a picture image forward, the light detecting system comprising:

a frame positioned at a predetermined position in front of the projector;

a detecting device movably installed on the frame for detecting the picture image;

a driving device installed on the frame for moving the detecting device; and a control device connected with the driving device and the detecting device for controlling the driving device to move the detecting device to various sampling positions on the frame and to control the detecting device to detect the picture image at each of the sampling positions.

2. The light detecting system of claim 1 wherein the control device can use the driving device to move the detecting device to a plurality of predetermined sampling positions on the frame and use the detecting device to detect the light intensity of the picture image at each of the sampling positions and then compute average lumen value, light uniformity, color temperature, color coordinate, color balance, color uniformity or color contrast ratio of the picture image according to the detected light intensities.

3. The light detecting system of claim 1 wherein the control device is connected with the projector and the picture image projected by the projector is created by the projector according to an image signal transmitted from the control device.

4. The light detecting system of claim 1 wherein one rail is horizontally installed at each of the upper and lower ends of the frame, and the upper and lower ends of the detecting device are slidably installed on the two rails separately and can be moved toward the left or right end of the frame.

5. The light detecting system of claim 4 wherein the driving device comprises:

two wheels rotatably fixed at the left and right ends of the frame;

a circular bell encircled around the two wheels for moving the detecting device; and a step motor installed on the frame for driving the circular bell according to a control signal transmitted from the control device to move the detecting device to each of the sampling positions on the frame.

6. The light detecting system of claim 1 wherein the detecting device comprises a column-shaped chassis and a plurality of light sensors installed on the chassis for sensing the light intensity of the picture image.

7. The light detecting system of claim 6 wherein at least one of the light sensors is movably installed on the chassis, and the detecting device further comprises a step motor installed on the chassis for moving the movable light sensor to various sampling positions on the chassis according to the control signal transmitted from the control device.

8. The light detecting system of claim 6 wherein at least one of the light sensors is fixed at a predetermined position on the chassis, and when the driving device moves the detecting device to each of the sampling positions on the frame, the fixed light sensor is used to detect the light intensity of the picture image at each of the sampling positions.

9. The light detecting system of claim 6 wherein the light sensors are fixed at various positions on the chassis, and when the driving device moves the detecting device to each of the sampling positions on the frame, the control device can select any of the light sensors to detect the light intensity of the picture image.

10. The light detecting system of claim 1 further comprising a screen installed on the frame which comprises at least one position mark wherein when the projector projects the picture image to the screen, the position mark on the screen is used for calibrating the position of the picture image projected on the screen.

* * * * *